United States Patent [19]

Hirayama

[11] 4,446,497

[45] May 1, 1984

[54] VIDEO HEAD DRIVING UNIT WITH NONLINEAR LEAF SPRING FORCE

[75] Inventor: Hiromichi Hirayama, Yokosuka, Japan

[73] Assignee: Victor Company of Japan, Limited, Yokohama, Japan

[21] Appl. No.: 300,452

[22] Filed: Sep. 8, 1981

[30] Foreign Application Priority Data

Sep. 9, 1980 [JP] Japan ............................ 55-128246[U]
Sep. 10, 1980 [JP] Japan ............................ 55-128765[U]
Sep. 11, 1980 [JP] Japan ............................ 55-129516[U]

[51] Int. Cl.$^3$ .......................... G11B 21/18; G11B 5/52
[52] U.S. Cl. ........................................ 360/109; 360/77
[58] Field of Search ................ 360/109, 77, 70, 10.2, 360/105, DIG. 1

[56] References Cited

U.S. PATENT DOCUMENTS

| | | | |
|---|---|---|---|
| 3,995,317 | 11/1976 | Schmidt | 360/109 |
| 4,151,569 | 4/1979 | Hathaway | 360/77 |
| 4,236,185 | 11/1980 | Obremski | 360/109 |
| 4,314,284 | 2/1982 | Sato et al. | 360/10.2 |
| 4,365,279 | 12/1982 | Kinjo | 360/109 |

Primary Examiner—Stuart N. Hecker
Attorney, Agent, or Firm—Lowe, King, Price & Becker

[57] ABSTRACT

In a video head driving unit having a rotary drum and a stationary drum, a horizontal yoke is secured to a leaf spring having a non-linear spring which is in turn connected to the rotary drum for rotation therewith. Video transducer heads are respectively mounted on the opposite ends of the yoke. The yoke is resiliently pivotally tiltable about an axis transverse thereto by an electromagnetic arrangement in response to a control signal so that the video heads are displaced in vertical position as they rotate with the rotary drum during "trick play mode". The leaf spring and yoke are so arranged that they are disengaged from each other at one of the diametrically opposite positions when the yoke is pivotally moved beyond a predetermined range of tilt angles, whereby the leaf spring exerts a non-linear spring force against the yoke to provide a higher tension to the yoke when same is pivotally moved within the range than when same is pivotally moved beyond the range.

16 Claims, 20 Drawing Figures

VIDEO HEAD DRIVING UNIT WITH NONLINEAR LEAF SPRING FORCE

BACKGROUND OF THE INVENTION

The present invention relates generally to video tape recorders, and in particular to such recorders including a video head driving unit which permits slow-motion and stop-motion video images during the so-called "trick play mode".

Attempts which have hitherto been made to provide the feature of trick play mode involve the use of a horizontal yoke carrying at each end thereof a video transducer head. The yoke is pivotally mounted within a rotary drum so that it rotates with the drum while moving pivotally about a transverse axis to displace the video heads in vertical position during trick play mode. An electromagnetic arrangement is provided which responds to a control signal by tilting the yoke to a desired angle so that the video heads are displaced from the horizontal and shifted in position for repeated or skipped tracing of the tracks. A prior attempt involves the use of a spring for restoring the yoke upon de-energization of the electromagnetic arrangement. In this case, the latter arrangement needs to overcome the spring action when moving the yoke. However, the spring tension needs to be sufficient to withstand vibrations which are likely to occur for video tape recorders of the portable type when videotaping moving objects. Difficulties therefore arise in satisfying these conflicting factors.

One approach would be to secure the pivot point of the yoke to a leaf spring, while preventing contact between points of the pivot point and leaf spring. However, the spring tends to exhibit a hysteresis characteristic. This causes the yoke and hence the video heads to remain displaced from the horizontal home position even when the control signal is removed from the yoke operating arrangement.

SUMMARY OF THE INVENTION

According to the invention, there is provided a video head driving unit for a video tape recording and/or reproducing apparatus, which comprises, a stationary drum; a rotary drum having a vertical shaft rotatably supported by the stationary drum; a leaf spring disposed substantially in a plane perpendicular to the sharft and secured to the rotary drum such that the leaf spring is rotatable with the rotary drum and resiliently bendable about a center axis in the plane; a horizontal yoke extending in a direction transverse to the center axis substantially across the diameter of the rotary drum for carrying at each end thereof a video transducer head. The yoke is secured to the leaf spring in a position adjacent the shaft for rotation with the rotary drum. Contact is made by the yoke with the leaf spring at diametrically opposite positions with respect to and remote from the shaft for pivotal movement with the leaf spring about the center axis. The yoke is pivotally moved against the spring about the center axis to a desired tilt angle in response to a signal applied thereto so that the video transducer heads are displaced in a direction perpendicular to the direction of rotation of the rotary drum.

Since the yoke and leaf spring are maintained in contact with each other at diametrically opposite positions, both members tend to pivotally move as a single unit, eliminating the undesirable hysteresis action.

In a preferred embodiment, the leaf spring and yoke are so arranged that they are disengaged from each other at one of the diametrically opposite positions when the yoke is pivotally moved beyond a predermined range of tilt angles, whereby the leaf spring exerts a non-linear spring force against the yoke to provide a higher tension to the yoke when same is pivotally moved within the range than when same is pivotally moved beyond the range.

BRIEF DESCRIPTION OF THE DRAWINGS

The invention will be further described by way of example with reference to the accompanying drawings, in which.

DETAILED DESCRIPTION

Figure 1:
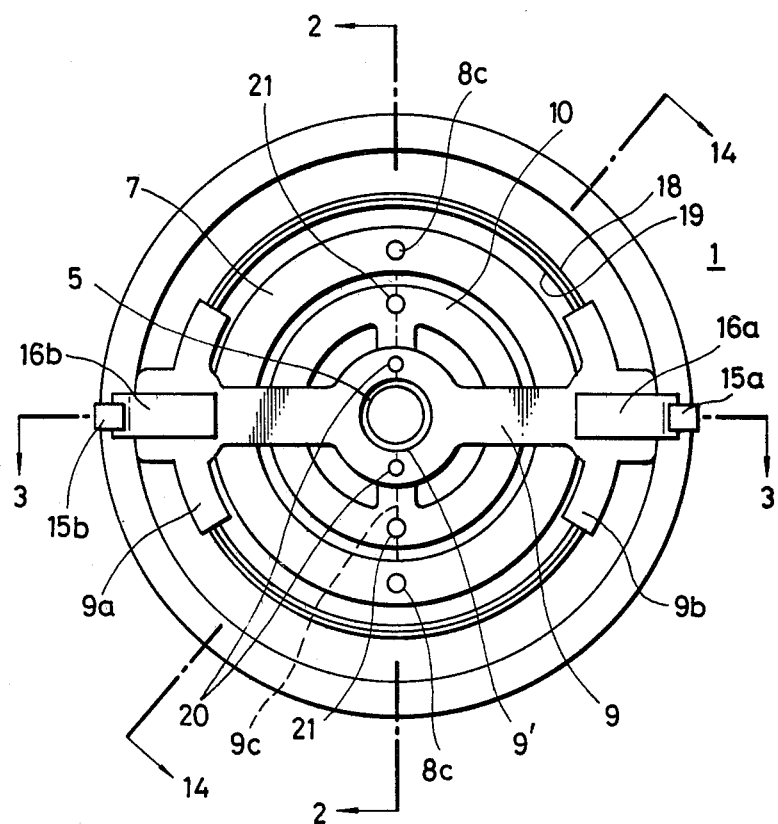
FIG. 1 is a top plan view of the video head driving unit with a rotary drum being removed.
Figure 2:
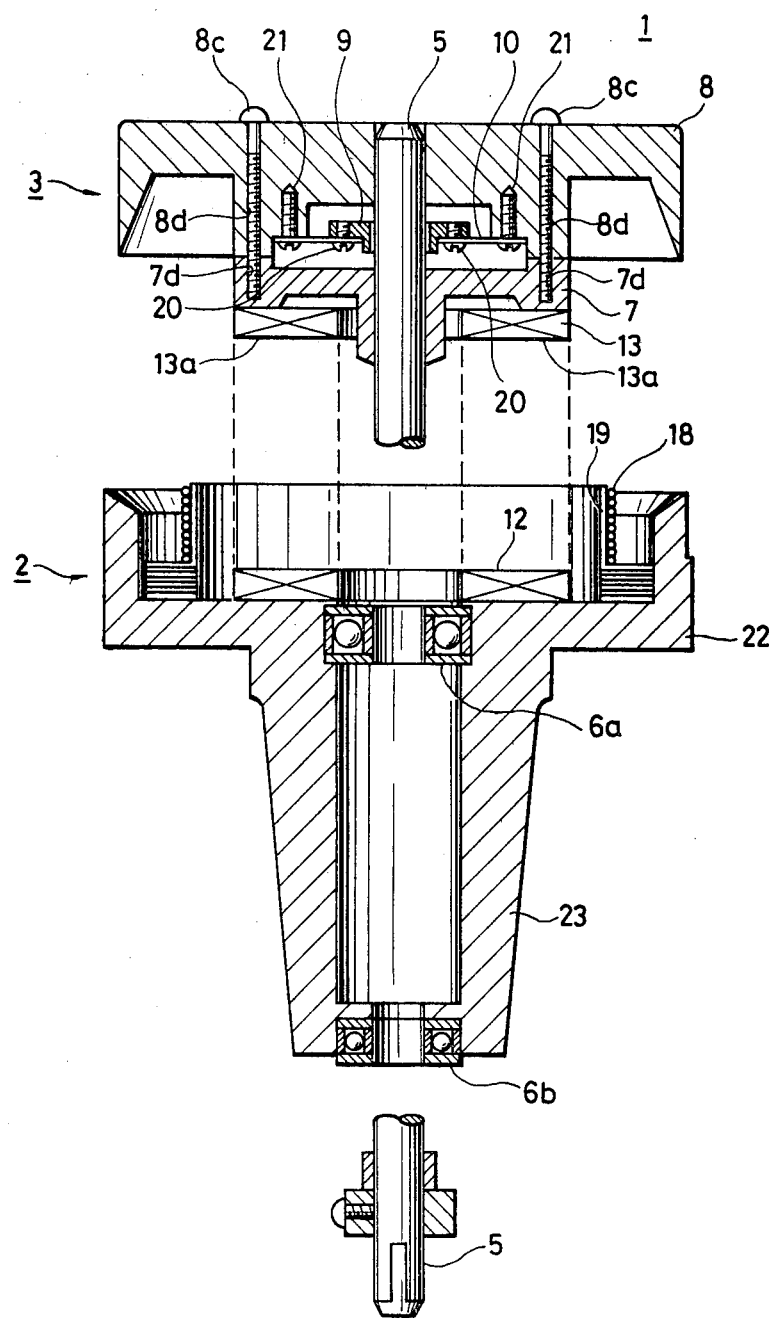
FIG. 2 is a cross-sectional view taken along the lines 2—2 of FIG. 1.
Figure 3:
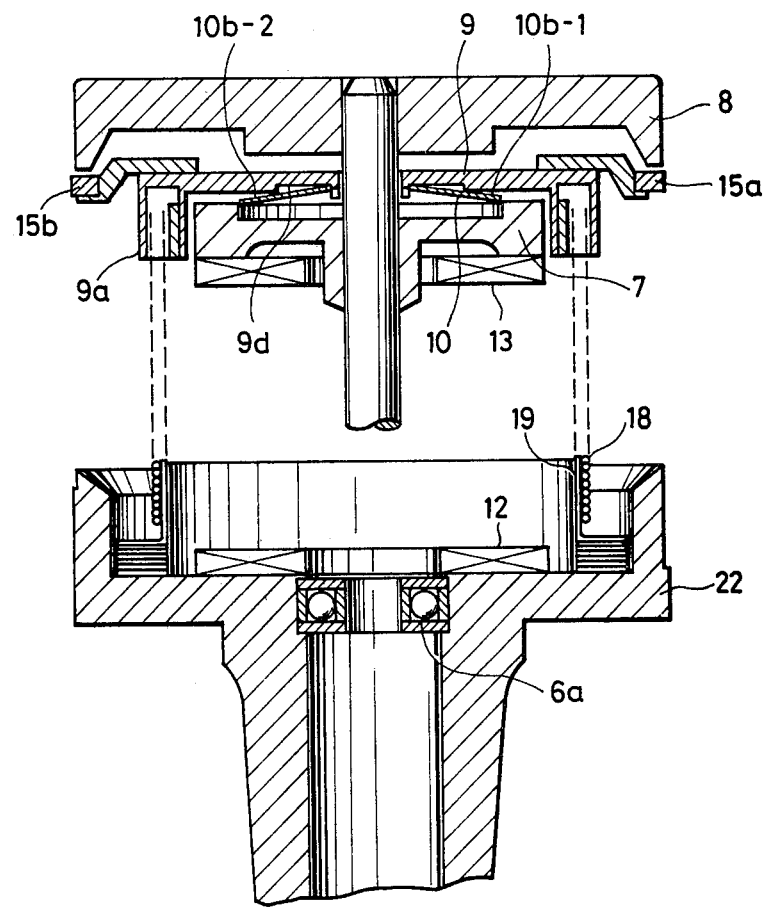
FIG. 3 is a cross-sectional view taken along the lines 3—3 of FIG. 1.
Figure 14:
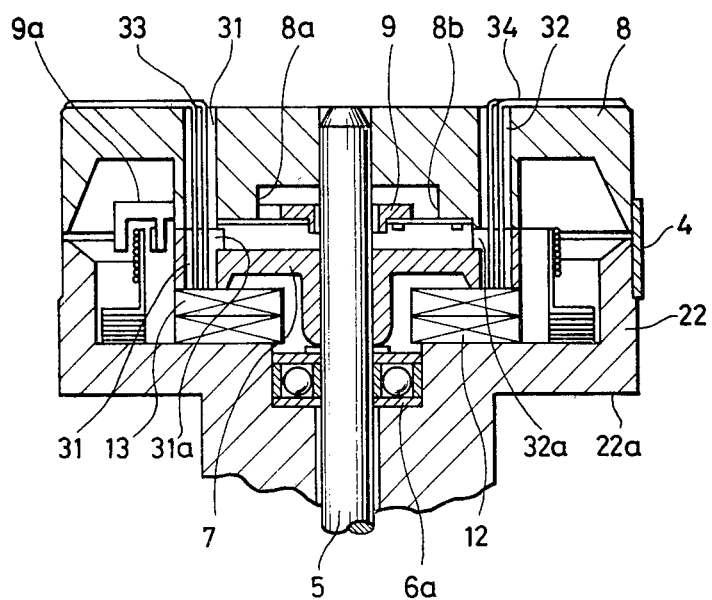
FIG. 14 is a cross-sectional view taken along the lines 14—14 of FIG. 1.

Referring to FIGS. 2 and 3, a video head driving unit 1 of the invention is illustrated in cross-sections taken respectively along the lines 2—2 and 3—3 of FIG. 1 wherein the inside of the driving unit 1 is illustrated with an upper rotating drum 8 removed. The driving unit 1 generally comprises an upper rotating part 3 and a lower stationary part 2 which are operatively coupled together when in operation as shown in FIG. 14 with a tape 4 in contact with the outer circumference of the rotary and stationary drums. The rotating part 3 comprises a base member 7 secured to the rotary drum 8 by screws 8c, 8c that extend through threaded aligned bores 8d, 7d, and the rotating ring coil 13 of a rotary transformer of a known construction which is adhesively secured to the underside of the base member 7 for rotation therewith. The base 7 is secured to a vertical shaft 5 which is rotatably supported by bearings 6a and 6b in the stationary part 2.

Figure 4:
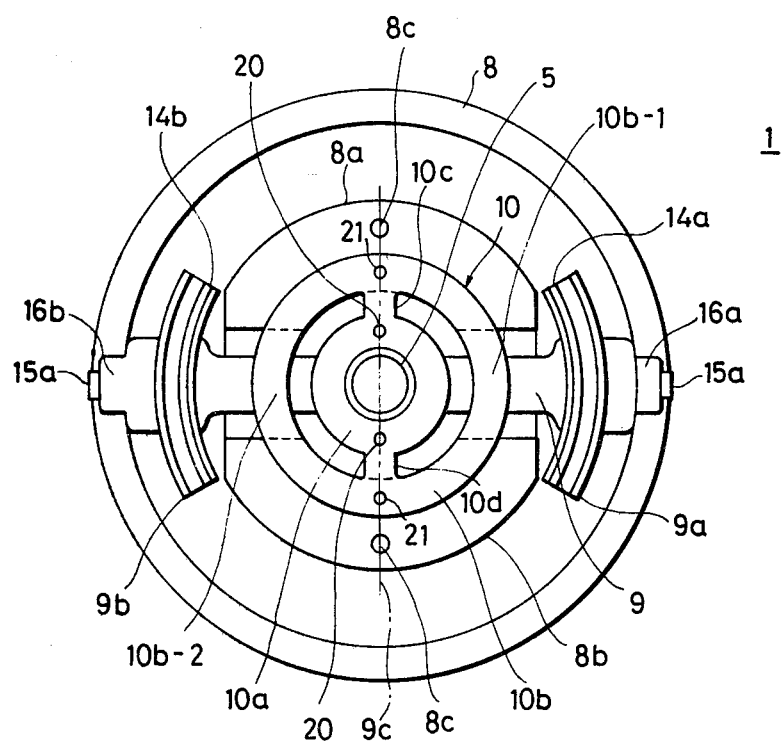
FIG. 4 is a bottom plan view of the rotary part of the driving unit of FIG. 1.

The rotating part 3 further includes a pivotally movable yoke 9 and a leaf spring 10. As best seen in FIG. 1 the yoke 9 comprises a pair of arms extending in opposite directions from an annular center having a hole 9' through which the rotary shaft 5 loosely extends. Adjacent to the opposite ends of the yoke 9 are arcuate-shaped slotted members 9a and 9b which, as best seen in FIG. 4, are formed with arched passageways in which permanent magnets 14 are respectively disposed. Video heads 15a and 15b are mounted respectively on the opposite ends of the yoke 9 by means of brackets 16a, 16b, respectively, and electrically connected to the rotary coil 13 through conductors in a manner described later. The yoke 9 is secured to the leaf spring 10 by screws 20, 20 at diametrically opposite positions aligned with an axis 9c transverse to its length so that the yoke is pivotally movable about the axis 9c to a desired tilt angle in a manner to be described.

Figure 5A:
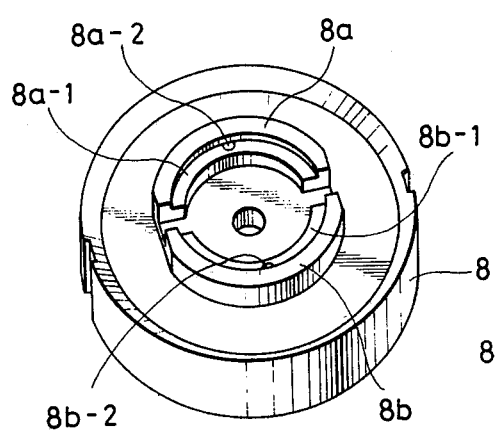
FIGS. 5a and 5b are perspective views of a pair of mounts secured to the rotary drum of FIG. 1.

The leaf spring 10 comprises, as shown in FIG. 4, an inner annular section 10a and an outer annular section 10b interconnected by arm sections 10c and 10d which extend in a direction parallel with the pivot axis 9c. The leaf spring 10 is mounted on recesses 8a-1, 8b-1 of a pair of mounts or bushings 8a and 8b formed on the underside of the rotary drum 8 as best seen in FIG. 5a and secured thereto by screws 21, 21 threadably engaged with screw holes 8a-2 and 8b-2 which are located on diametrically opposite positions aligned with the pivot axis 9c. Therefore, the yoke 9 is both tilted and restored to the horizontal position by the spring 10. The video heads 15a, 15b are thus rendered displaceable vertically in opposite directions from the horizontal while they are rotating about the shaft 5 with the rotary drum 8.

The stationary part 2 comprises a drum 22 formed with a hollow shaft 23 in which the bearings 6a and 6b are mounted. Inside of the stationary drum 22 is located the ring-shaped stationary coil 12 of the rotary transformer and a ring-shaped driving coil 18 mounted on a cylindrical core 19. Coils 12, 13 and 18 are disposed so that the stationary coil 12 is brought into proximity to the rotary coil 13 in face-to-face relationship and the driving ring coil 18 is inserted into the arcuate-shaped slots of the slotted members 9a and 9b when the rotary and stationary parts are fitted together. In a known manner the stationary coil 12 develops a voltage by induction with the rotary coil 13 to detect signals from the video heads 15a, 15b or serves to induce a voltage in the rotary coil 13 to supply video recording signals to the heads.

When the driving coil 18 is energized by control current which is typically a triangular wave supplied from a head position control circuit, now shown, a magnetic flux is generated to interact with the magnetic fluxes of permanent magnets 14a and 14b so that the yoke 9 is caused to pivotally move about axis 9c in a direction depending on the polarity of the control current.

According to a feature of the invention, the center annular portion of the pivotally movable yoke 9 is recessed upwardly at position 9d as seen in FIG. 3 to cause the outer half annular sections 10b-1 and 10b-2 of the leaf spring 10 to be located in a lower position with respect to its inner annular section 10a and hence with respect to the recessed portions 8a-1 and 8b-1 of the mounts 8a, 8b to which the spring 10 is secured. This serves to prestress the leaf spring 10 against the yoke 9 in opposite directions with respect to the pivot axis 9c. The opposite ends of the half sections 10b-1 and 10b-2 are arranged to keep pressure contact with the yoke 9 until the latter is pivotally tilted beyond a certain angle with respect to the horizontal in a manner described below.

Figure 6A:
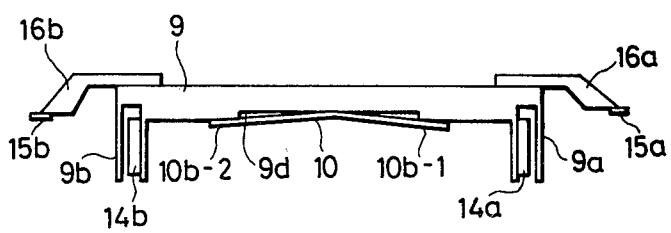
FIGS. 6a to 6c are views useful of describing the operation of the invention.
Figure 6B:
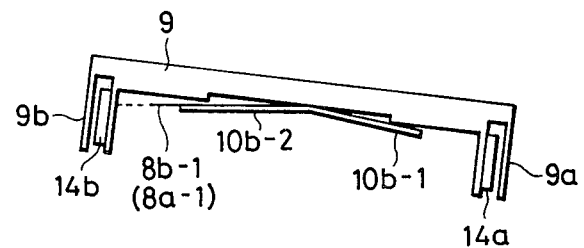
Figure 6C:
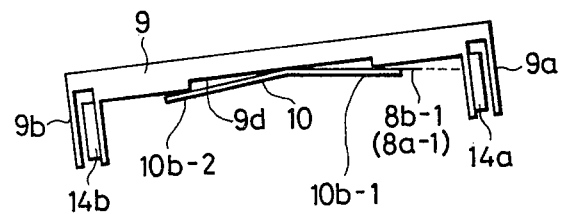

The operation of the invention is described with reference to FIGS. 6a to 6c. When the driving coil 18 is not energized, the yoke 9 is maintained in a neutral, or horizontal position (FIG. 6a). Upon energization of the coil 18 by current of a given polarity, the yoke 9 is tilted about axis 9c in a clockwise direction as illustrated in FIG. 6b and upon energization by current of opposite polarity the yoke 9 is tilted in a counterclockwise direction as illustrated in FIG. 6c. When the yoke 9 is pivotally moved in the clockwise direction the elastic deformation of outer half section 10b-1 of the leaf spring 10 increases while there is a decrease in the elastic deformation of the other half section 10b-2. Therefore, the outer half section 10b-1 provides a spring force which linearly increases as a function of the tilt angle of the yoke 9 relative to the horizontal as indicated at Ia in FIG. 7a, while the other outer half section 10b-2 provides a spring force which linearly varies as indicated at IIb in FIG. 7b as a function of the same tilt angle until it reaches an angle "$\alpha$" where the outer half section 10b-2 engages the recessed portions 8a-1 and 8b-1 of the mounts 8a, 8b and is disengaged from pressure contact with the yoke 9 as seen in FIG. 6b.

Figure 7A:
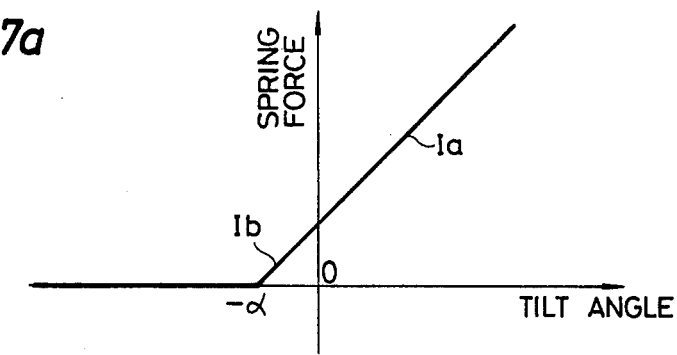
FIGS. 7a and 7b are graphs illustrating plots of spring force as a function of tilt angle.
Figure 7B:
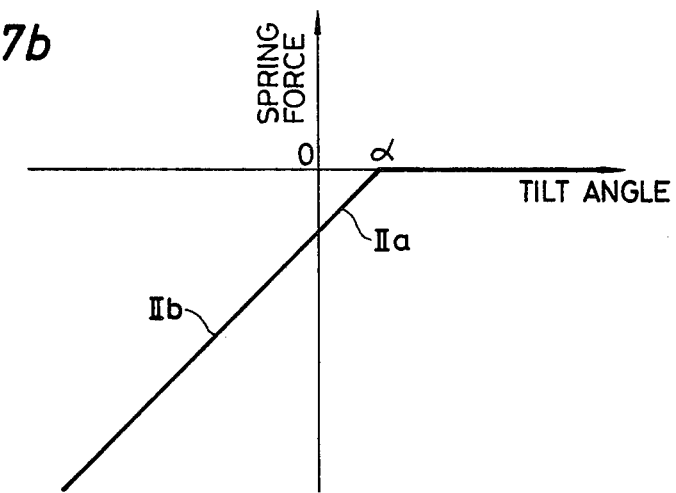

When the yoke 9 is pivotally moved in the counterclockwise direction, the half section 10b-2 provides a spring force which linearly increases as indicated at IIb in FIG. 7b, while the half section 10b-1 provides a spring force which varies linearly as indicated at Ia in FIG. 7a as a function of the tilt angle until it reaches an angle "$-\alpha$" where the outer half section 10b-1 engages the recessed portions 8a-1 and 8b-1 and is disengaged from the yoke 9.

Figure 8:
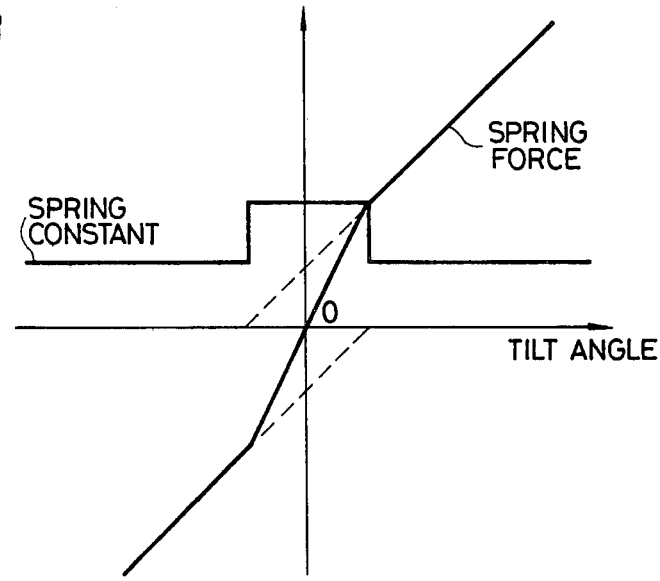
FIG. 8 is a graph illustrating the operating characteristic of the leaf spring employed in the invention.

Therefore, the combined spring force exerted on the yoke 9 becomes nonlinear as shown in FIG. 8. As seen from FIG. 8, the combined spring force of the yoke 9 varies sharply in a range of tilt angles from $-\alpha$ to $\alpha$ as compared with that outside of the range. Thus, when the yoke 9 is tilted to a small angle the combined spring constant, which is the derivative of the nonlinear plot of FIG. 8, is twice the value obtained when the yoke is further tilted.

It is noted therefore that when the driving coil 18 is not energized, the yoke 9 can be maintained in the horizontal position with a relatively large restoring force so that the video heads 15a and 15b can be held in the normal position ensuring linearity in record tracks without using an additional holding means for the yoke during such periods. Since the combined spring constant is reduced when the yoke 9 is tilted beyond the predetermined range of angles, only a small amount of power is needed to overcome the spring force in order to control the tilt angle of the yoke 9 thus making it possible to reduce the size of the associated system while ensuring a high degree of precision in the displacement control.

Since the yoke 9 maintains contact at diametrically opposite positions with the outer half sections 10b-1 and in a predetermined range of tilt angles, the yoke resiliently, pivotally moves with the leaf spring 10 about the transverse axis 9c. This eliminates undesirable hysteresis spring action which would produce a certain amount of residual displacement in tilt angle even when no signal is supplied to the driving coil 18 if the yoke is only connected to the inner center section 10a of the spring 10.

Figure 9:
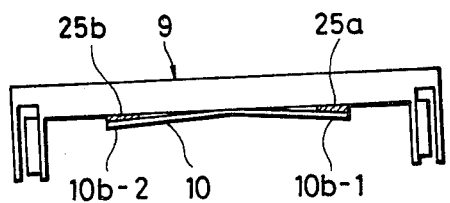
FIG. 9 is an illustration of an alternative form of the invention.
Figure 10:
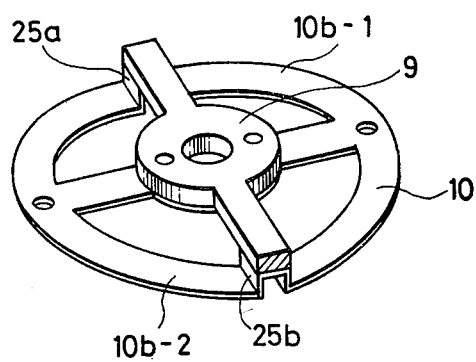
FIG. 10 is an illustration of another alternative form of the invention.

Instead of the recess 9d provided on the yoke 9, spacers 25a and 25b could alternatively be provided between the yoke 9 and the half sections 10b-1 and 10b-2, respectively, as shown in FIG. 9. A further alternative arrangement is shown in FIG. 10 in which the leaf spring 10 is raised as shown at positions 26a, 26b respectively in the half sections 10b-1 and 10b-2 to serve as the spacers when the yoke 9 is secured to the center annular portion of the spring 10.

Figure 5B:
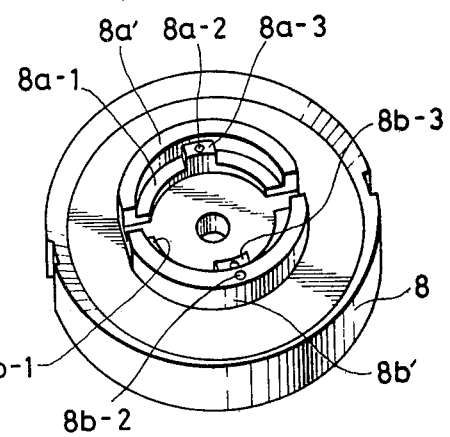
Figure 11:
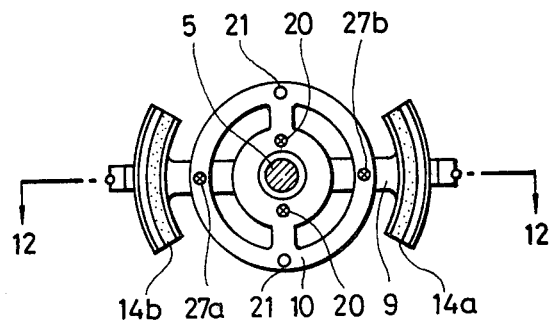
FIG. 11 is a bottom view of the yoke and leaf spring in a modified embodiment.
Figure 12:
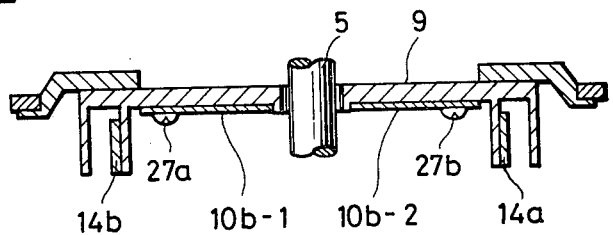
FIG. 12 is a cross-sectional view taken along the lines 12—12 of FIG. 11.

FIGS. 11 and 12 are top and side sectional views of a modification of the present invention in which the outer half sections 10b-1 and 10b-2 of the leaf spring are firmly secured to the yoke 9 by screws to permit both members to provide unitary pivotal movement. In this embodiment mounts 8a' and 8b'; as illustrated in FIG. 5b, include raised portions 8a-3 and 8b-3 on the stepped portions 8a-1 and 8b-1, respectively, so that the outer half sections 10b-1 and 10b-2 of the leaf spring 10 are allowed to bend in an increased range. This arrangement successfully avoids the undesirable hysteresis action just described.

In the above described embodiments, the video heads 15a, 15b are mounted on the pivoted yoke 9. This is not ideal for portable video tape recorders when videotaping moving objects since such video head mounting yoke 9 still tends to move in response to vibrations.

Figure 13:
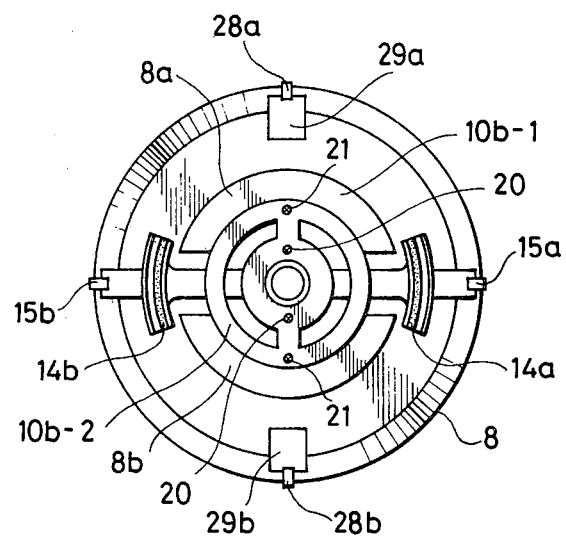
FIG. 13 is a bottom view of the yoke and leaf spring in a further modification of the invention.

To this end in FIG. 13 is illustrated a modified embodiment in which additional video recording heads 28a and 28b are respectively secured to the inner periphery of the rotary drum 8 by diametrically opposed brackets 29a and 29b. The additional video heads 28a and 28b are switched for connection to the rotary coil 13 of the rotary transformer and the video heads 15a and 15b are disconnected therefrom when the video tape recorder is operated in a recording mode. With this arrangement the recording heads 28a and 28b are rotated with the rotary drum 8 and therefore are not subject to vibration. This assures linear tracks even though the recorder is being hand-carried when moving objects are videotaped. During playback mode the video heads 15a and 15b are switched to the rotary coil 18 and the additional recording heads are switched off to permit the recorder to operate in the so-called "trick play mode". Since the recorded tracks are rendered linear, the video heads 15a and 15b operate ideally in the trick play mode.

Figure 15:
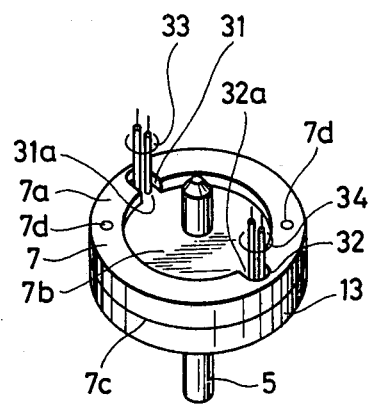
FIG. 15 is a perspective view of the base member of FIG. 14.
Figure 16:
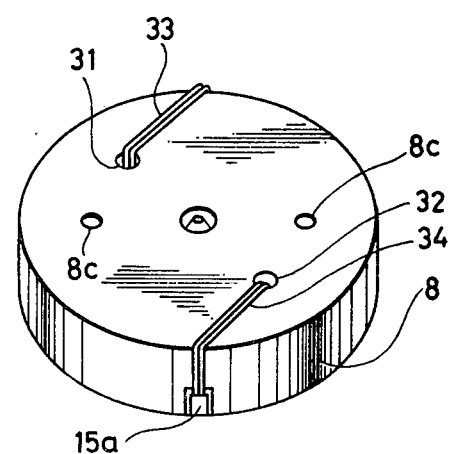
FIG. 16 is a perspective view of the rotary drum of FIG. 14.

In prior art head driving units the conductors leading from the rotary coil 13 to the video heads 15a, 15b have tended to presenting an obstacle to the pivotal movement of the yoke 9. This problem is avoided by an arrangement shown in FIGS. 14 to 16 in which FIG. 14 is an illustration of a cross-sectional view taken along the lines 14—14 of FIG. 1. This is accomplished by providing throughbores 31 and 32 extending from the upper surface of the rotary drum 8 through the base member 7 down to the rotary transformer coil 13. The throughbores 31 and 32 are located in diametrically opposite positions to each other with respect to the rotary shaft 5; bores 31 and 32 are angularly displaced from the yoke 9. Conductors 33 and 34 are respectively connected from the rotary transformer coil 13 through the bores 31 and 32 to the upper surface of the drum 8 where they are bent for connection to the video heads 15a and 15b. The throughbores 31 and 32 are open at 31a and 32a, respectively, in the base member 7, as clearly shown in FIG. 15 to permit the conductors 33 and 34 to bend inwardly into a recessed portion 7b of the base 7. This facilitates precise machining of base 7 during assemblage so that the base face 7a, which contacts the rotary drum 8, is parallel with a reference plane which is typically represented by the bottom surface 22a of the stationary drum 22.

What is claimed is:

1. A video tape recording and/or reproducing apparatus, comprising:
    a rotary drum having a pair of openings at diametrically opposite positions and rotatable about a vertical axis;
    a horizontal yoke elongated in a direction transverse to said vertical axis and carrying video transducer heads at opposite ends thereof in said openings respectively;
    a leaf spring secured to said rotary drum at first diametrically opposite positions with respect to said vertical axis and further secured to said yoke at second diametrically opposite positions aligned with said first diametrically opposite positions along a line which is perpendicular to the direction of elongation of said yoke for tiltably supporting said yoke about a horizontal axis so that said video heads are vertically movable in said openings, the arrangement of said leaf spring being such that a nonlinear spring force is exerted against said yoke, the spring force being greater when the yoke is tilted within a predetermined range than when the yoke is tilted beyond said range; and
    means for tilting said yoke against said spring about said horizontal axis in response to a signal applied thereto to displace said video heads from a horizontal position.

2. A video tape recording and reproducing apparatus as claimed in claim 1 wherein said yoke is formed with a recess, and wherein said leaf spring has an inner portion thereof disposed in said recess and an outer portion thereof making contact with non-recessed portions of said yoke.

3. A video tape recording and/or reproducing apparatus as claimed in claim 1, further comprising a pair of horizontally spaced apart spacers secured to said yoke, and wherein said leaf spring has an inner portion thereof disposed in the space between said spacers and an outer portion thereof in contact with said spacers.

4. A video tape recording and/or reproducing apparatus as claimed in claim 1 wherein said leaf spring includes raised portions in contact with said yoke at diametrically opposite positions with respect to said vertical axis.

5. A video tape recording and/or reproducing apparatus as claimed in claim 1 wherein said leaf spring is secured to said yoke at third diametrically opposite positions with respect to said vertical axis, said third diametrically opposite positions being displaced 90 degrees from said second diametrically opposite positions, said rotary drum being provided with raised portions aligned with said first and second diametrically opposite positions, said leaf spring being secured to said rotary drum on said raised portions so that the leaf spring has an outer portion thereof bent symmetrically about said horizontal axis.

6. A video tape recording and/or reproducing apparatus as claimed in claim 1 wherein said leaf spring comprises an inner ring, an outer ring and a pair of bridge sections interconnecting said inner and outer rings, said bridge sections being aligned with said first and second diametrically opposite positions.

7. A video tape recording and/or reproducing apparatus as claimed in claim 1 further comprising a stationary drum and a pair of additional video transducer heads mounted in diametrically opposite positions on said stationary drum with respect to said vertical axis and displaced 90 degrees respectively to the first-mentioned video transducer heads.

8. A video tape recording and/or reproducing apparatus as claimed in claim 7 further comprising a rotary transformer having a rotating part mounted on said rotary drum, and a stationary part mounted on said stationary drum for inductively selectively coupling an external circuit through said stationary and rotary parts to said first or second video transducer heads.

9. A video tape recording and/or reproducing apparatus, comprising:
   a rotary drum rotatable about a vertical axis;
   a horizontal yoke elongated in a direction transverse to said vertical axis and carrying video transducer heads at opposite ends;
   a leaf spring secured to said rotary drum at first diametrically opposite positions with respect to said vertical axis and further secured to said yoke at second diametrically opposite positions aligned with said first diametrically opposite positions along a line which is perpendicular to the direction of elongation of said yoke for tiltably supporting said yoke about a horizontal axis so that said video heads are vertically movable;
   means for applying a force to said yoke to tilt the yoke about said horizontal axis against said spring to displace said video heads from a horizontal position;
   the arrangement of said leaf spring being such that a nonlinear spring force is applied by the spring to said yoke, the spring force being greater when the yoke is tilted by the force applying means within a predetermined range than when the yoke is tilted beyond said range and being such that the yoke is horizontally disposed when zero force is applied by the force applying means to the yoke after a non-zero force has been applied by the force applying means to the yoke.

10. A video tape recording and reproducing apparatus as claimed in claim 9 wherein said yoke is formed with a recess, and wherein said leaf spring has an inner portion thereof disposed in said recess and an outer portion thereof making contact with non-recessed portions of said yoke.

11. A video tape recording and/or reproducing apparatus as claimed in claim 9 further comprising a pair of horizontally spaced apart spacers secured to said yoke, and wherein said leaf spring has an inner portion thereof disposed in the spaced between said spacers and an outer portion thereof in contact with said spacers.

12. A video tape recording and/or reproducing apparatus as claimed in claim 9 wherein said leaf spring includes raised portions in contact with said yoke at diametrically opposite positions with respect to said vertical axis.

13. A video tape recording and/or reproducing apparatus as claimed in claim 9 wherein said leaf spring is secured to said yoke at third diametrically opposite positions with respect to said vertical axis, said third diametrically opposite positions being displaced 90 degrees from said second diametrically opposite positions, said rotary drum being provided with raised portions aligned with said first and second diametrically opposite positions, said leaf spring being secured to said rotary drum on said raised portions so that the leaf spring has an outer portion thereof bent symmetrically about said horizontal axis.

14. A video tape recording and/or reproducing apparatus as claimed in claim 9 wherein said leaf spring comprises an inner ring, an outer ring and a pair of bridge sections interconnecting said inner and outer rings, said bridge sections being aligned with said first and second diametrically opposite positions.

15. A video tape recording and/or reproducing apparatus as claimed in claim 9 further comprising a stationary drum and a pair of additional video transducer heads mounted in diametrically opposite positions on said stationary drum with respect to said vertical axis and displaced 90 degrees respectively to the first-mentioned video transducer heads.

16. A video tape recording and/or reproducing apparatus as claimed in claim 15 further comprising a rotary transformer having a rotating part mounted on said rotary drum and a stationary part mounted on said stationary drum for inductively selectively coupling an external circuit through said stationary and rotary parts to said first or second video transducer heads.

* * * * *